July 14, 1931. E. CHRISTIANSEN 1,813,907
MACHINE FOR MOLDING PIE CASINGS
Filed May 17, 1928 5 Sheets-Sheet 1

July 14, 1931.  E. CHRISTIANSEN  1,813,907
MACHINE FOR MOLDING PIE CASINGS
Filed May 17, 1928  5 Sheets-Sheet 3

Ejnar Christiansen, Inv.
by C. A. Snow & Co. Attys.

July 14, 1931.    E. CHRISTIANSEN    1,813,907
MACHINE FOR MOLDING PIE CASINGS
Filed May 17, 1928    5 Sheets-Sheet 4

July 14, 1931.  E. CHRISTIANSEN  1,813,907

MACHINE FOR MOLDING PIE CASINGS

Filed May 17, 1928  5 Sheets-Sheet 5

Ejnar Christiansen, Inv.
by C. A. Snow & Co. attys.

Patented July 14, 1931

1,813,907

UNITED STATES PATENT OFFICE

EJNAR CHRISTIANSEN, OF BIRMINGHAM, ENGLAND, ASSIGNOR OF ONE-HALF TO CARL OSCAR ERICSSON, OF BIRMINGHAM, ENGLAND

MACHINE FOR MOLDING PIE CASINGS

Application filed May 17, 1928, Serial No. 278,550, and in Great Britain May 25, 1927.

This invention comprises improvements in machines for molding pie casings from dough or pastry, and it has for its object a machine which will shape the casing by a rolling action.

The invention consists in the novel features of combination, arrangements and details herein illustrated, described or claimed. According to the present improvements also, the axis of rotation of the roller is stationary, whilst the mold is movable, so that the wall of the mold can be moved towards or from the roller. Preferably the mold is also mounted to be positively driven to rotate about its own axis, whilst the roller is free to revolve by its frictional contact with the dough or pastry. The roller is axially movable to be located in the mold during the molding operation or to be moved therefrom.

The mold is mounted on a rotatable table and is positively driven by means movable with the table, and means are provided for automatically cutting off the drive to the table at a certain position for the removal of the pie casing and the insertion of a fresh piece of dough or pastry.

The mold is removably fitted to the rotatable table for convenience in removing the pie casing, and conveniently the top of the rotatable table forms the bottom of the mold. Adjustable means may also be provided in order that the machine may be quickly set to give the predetermined thickness of the wall of the pie casing and also a predetermined thickness of the bottom of the casing. Automatic means are also provided in order that flour may be sprinkled into the mold during the molding operation, and thereby preventing the dough or pastry sticking to the molding tools.

Referring to the drawings:—

Figure 4 is a side view, partly in section, of the molding roller and trimming knife hereinafter referred to.

Figure 1:
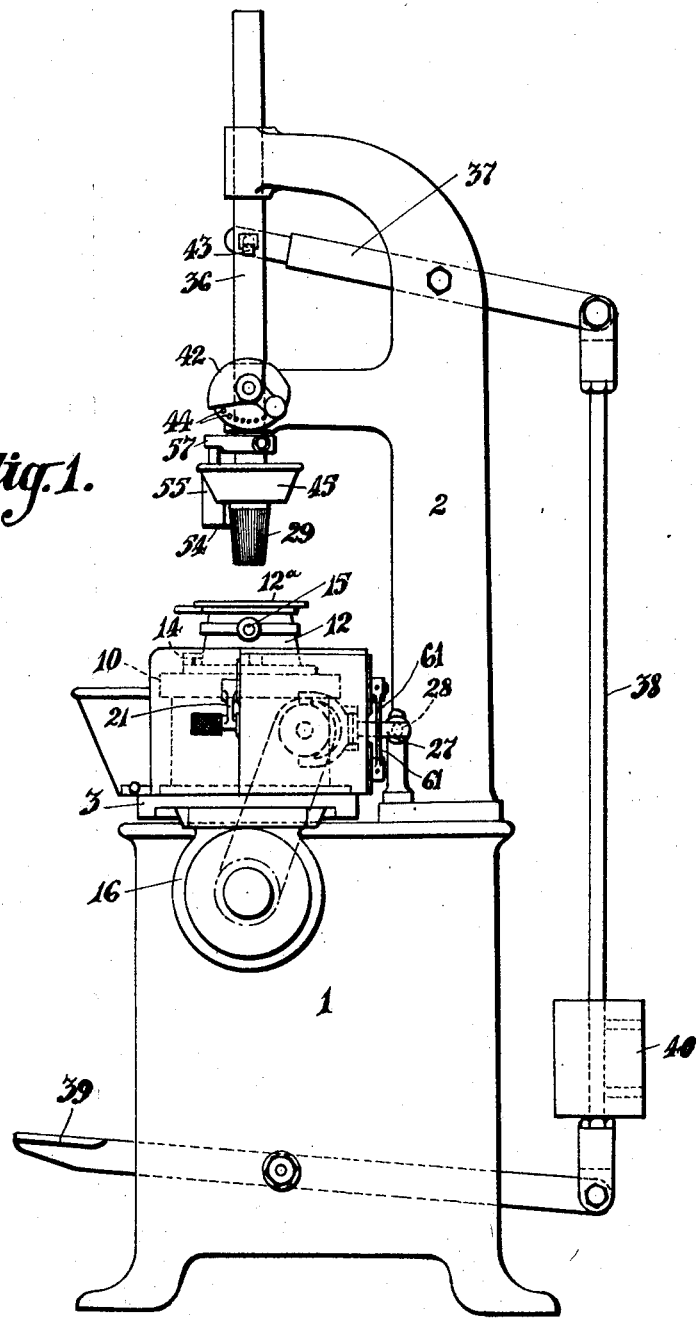
Figure 1 is a side elevation of a machine constructed according to this invention.
Figure 2:
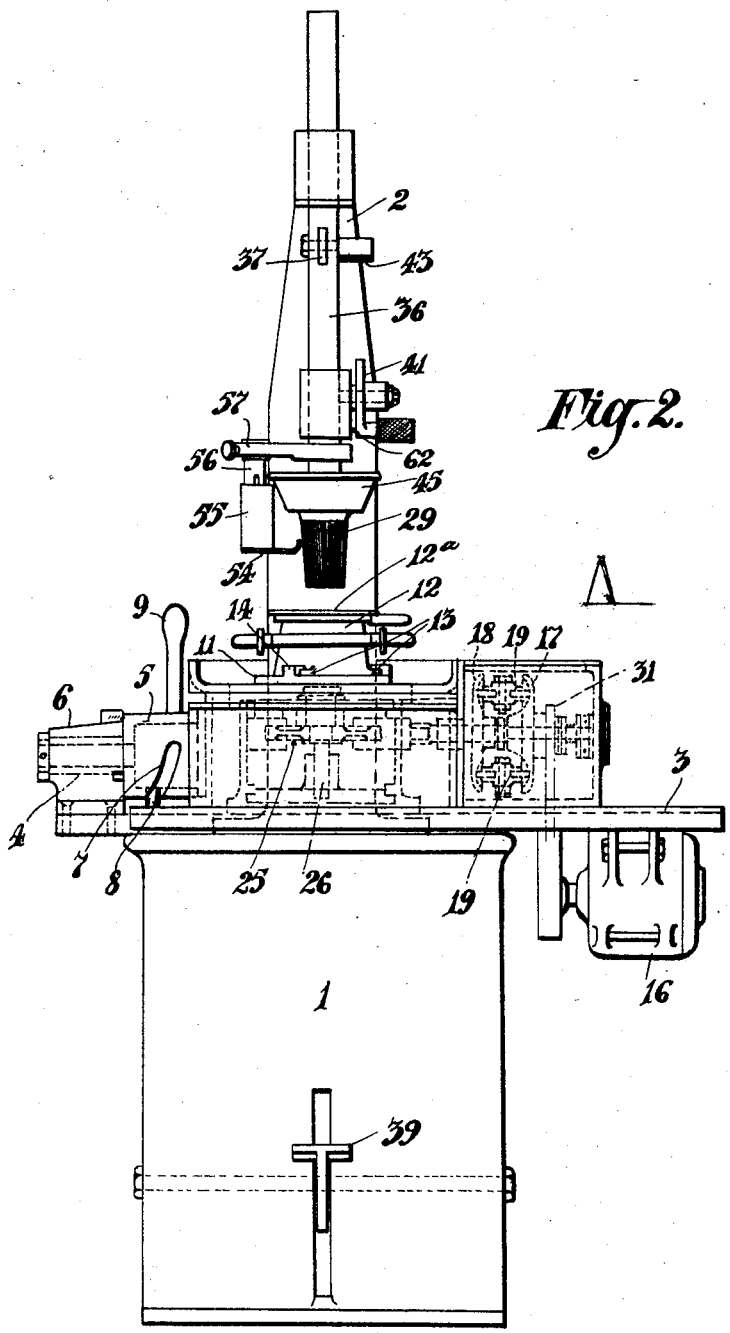
Figure 2 is a front view.
Figure 3:
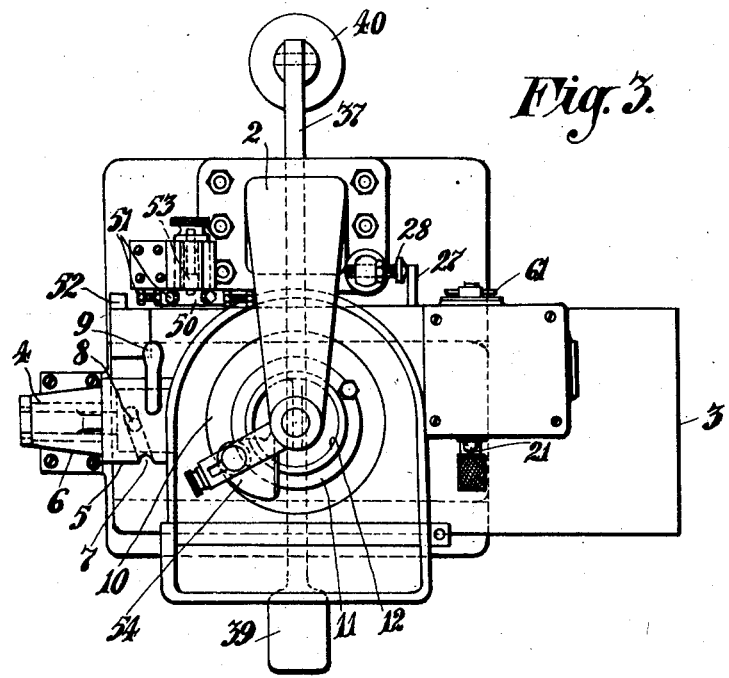
Figure 3 is a plan view.
Figure 6:
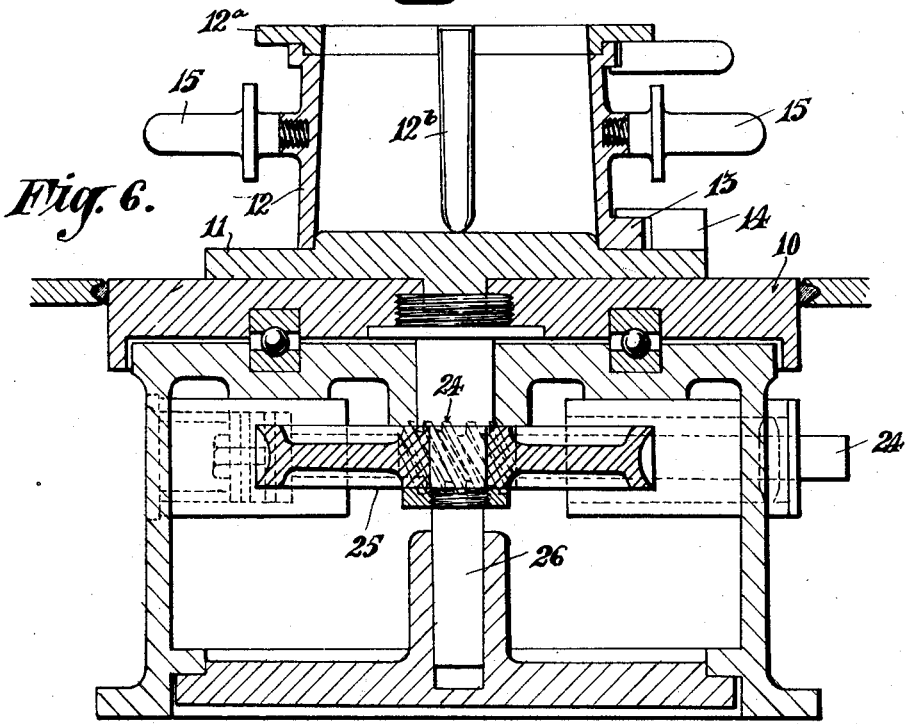
Figure 6 is a sectional side elevation showing the mould mounted on the rotating table.
Figure 4:
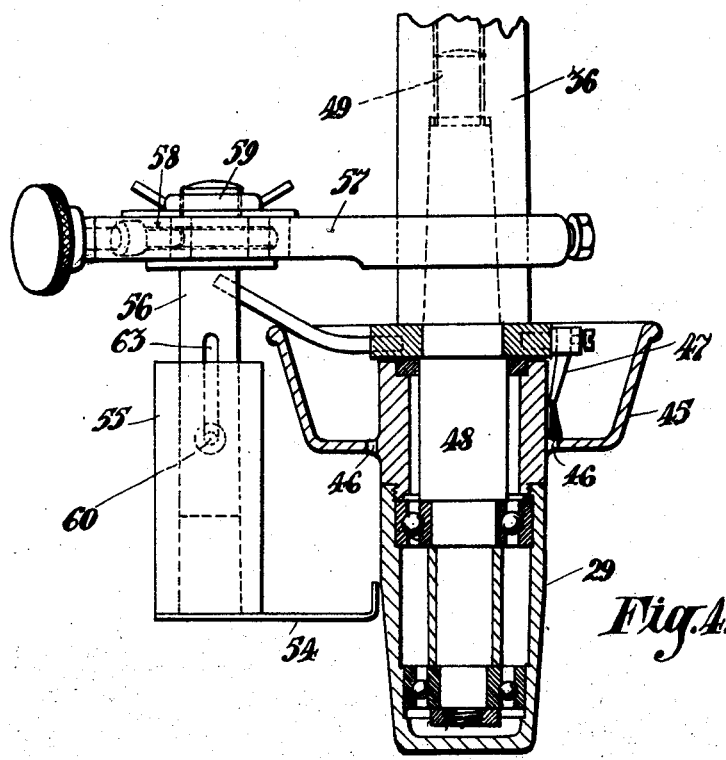
Figure 5:
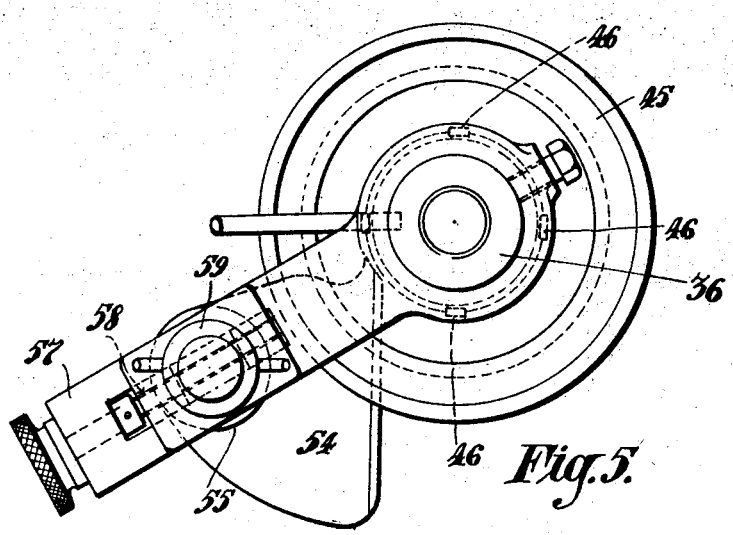
Figure 5 is a plan view of Figure 4.
Figure 7:
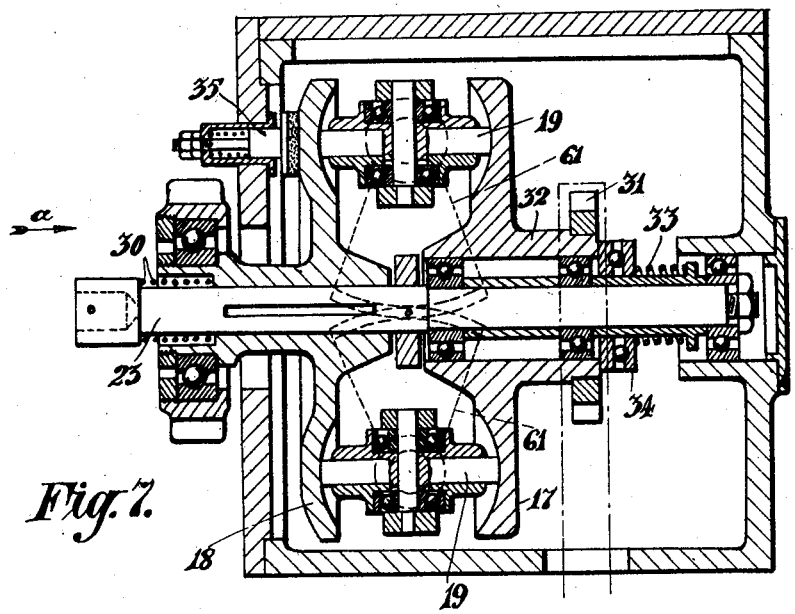
Figure 7 is a cross sectional elevation of the variable speed device, hereinafter referred to, for driving the rotating table carrying the mould.
Figure 8:
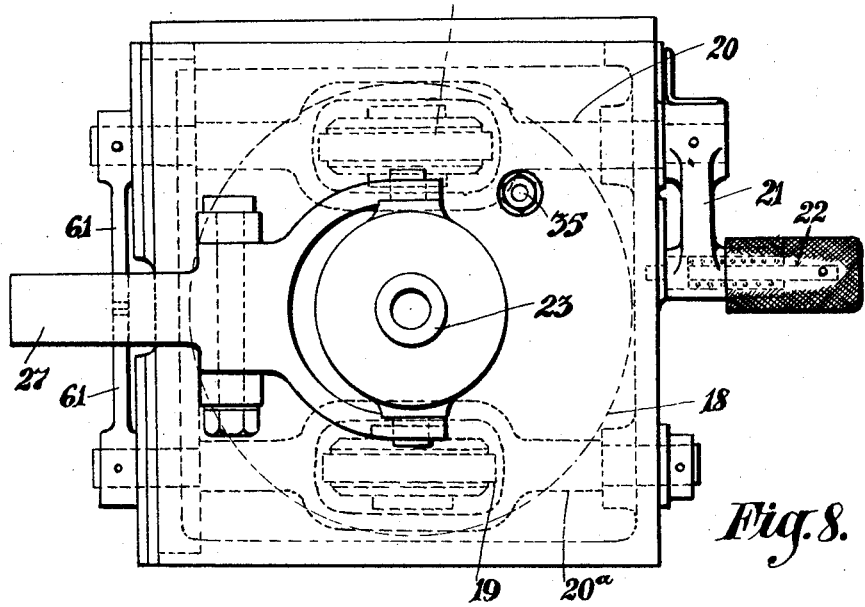
Figure 8 is an end view of Figure 7 looking in the direction of arrow $a$.

According to a convenient embodiment, the machine comprises a frame 1 which forms a stationary table or bed, and a bracket 2 which overhangs this stationary bed or table. The stationary bed is provided with a dovetailed top and a slide 3 is mounted therein so that it can move transversely thereacross. A spindle 4, having an enlarged head 5 is rotatably mounted in the bearing 6, and a cam groove 7 in the head engages a pin 8 carried by the slide 3. When therefore the spindle 4 is rotated by the lever 9 the slide 3 is moved. The slide 3 also may be moved by automatic means with a slow forward movement, and a quick return, the automatic means being conveniently controlled by a thumb or other lever. The transverse movement may be effected by a screwed spindle. This slide carries a rotatably mounted table 10 for receiving the mould. The top of the table has a plate 11 detachably fixed thereon which forms the bottom of the mould. The mould 12 for producing one particular form of pie casing has an annular wall, the interior surface of which is of the shape of a truncated cone, so that the diameter at the bottom is larger than the diameter at the top. This mould may be fixed in position in any convenient manner, and conveniently radially projecting lugs 13 are provided on the bottom of the mould for engaging under L-shaped projections 14 on the plate 11. The lugs 13 may be slightly wedge-shaped for engaging a correspondingly shaped surface of the projection 14 to firmly fix the mould on the table. Pins 15 may project from the wall of the mould for convenience in carrying the mould, and also for rotating the same into engagement or out of engagement with the said L-shaped lugs.

The rotatable table 10 is conveniently driven by an electric motor 16 mounted on the underside of the slide 3 through suitable transmission mechanism, which in the preferred form incorporates a variable speed device. The whole of the driving mechanism for the rotatable table therefore moves transversely with the table. The speed gear conveniently comprises two friction discs 17 and 18 between which two discs 19 are mounted for frictionally engaging the opposed faces of these discs 17 and 18. The intermediate friction discs 19 are mounted to pivot at right angles to the axes of rotation, and the opposed faces of the discs 17 and 18 are curved so that the discs 19 frictionally engage therewith in any position of adjustment. The intermediate discs 19 can therefore give a variable speed in accordance with their angular position, as they will contact with the face discs 17 and 18 at various distances from the axis of rotation. The spindle 20 controlling the angular position of the discs 19 may carry an arm 21 having a spring pressed finger piece 22 for engaging a perforated index plate, each perforation indicating the particular speed. The shafts 20 and 20a carrying the discs 19 are connected by the toothed quadrants 61 so that both discs 19 are controlled in unison. One friction disc 19 may be used instead of two as illustrated. One friction face plate 17 is driven from the electric motor whilst the other face friction plate 18 is keyed to a spindle 23 carrying a worm 24 which engages with a worm wheel 25 on a spindle 26 depending from the rotatable table. The face friction wheel 18 mounted on the spindle 23 is slidably mounted thereon and is adapted to be moved back out of frictional engagement by means of a pivoted lever 27 when the mould is centrally under the roller 29 by means of the projecting end of the lever engaging with a stop, comprising the adjustable pin 28. This face friction disc is normally pressed into the operative position by means of the spring 30. The disc 17 is freely mounted on the shaft 23 through the medium of ball bearings, and the chain sprocket wheel 31 is mounted on the sleeve 32 projecting from the disc 17. The sleeve 32 is capable of small longitudinal play so that the disc 17 may be maintained in contact with the discs 19 by the pressure of the spring 33 which bears on the thrust bearing 34 abutting against the end of the sleeve 32. When the disc 18 is moved out of contact with the discs 19 it moves against a friction brake which comprises a spring pressed plunger 35, such brake bringing the rotating table quickly to rest.

The molding roller 29 is carried by a rod 36 vertically slidable in the overhanging bracket 2 aforementioned, and for this purpose one end of a pivoted lever 37 passes through a slot in the rod whilst the other end is connected by a rod 38 to one end of a pivoted foot lever 39. A weight 40 is provided on this connecting rod so that the molding roller is normally held in the raised or inoperative position, and when the foot lever 39 is depressed the molding roller is moved down into the interior of the mold. A stop is provided for limiting the downward movement of the roller at a predetermined distance from the bottom of the mold, and this stop determines the thickness of the bottom of the pie casing. This stop conveniently comprises a lever 41 having an eccentrically curved edge 42, such lever being pivotally mounted to the overhanging bracket, and a projection 43 on the spindle being adapted to bear on the said eccentrically curved edge. This lever is adapted to be fixed conveniently in one of a series of positions such as by means of a spring pressed pin 62 carried thereby engaging one of a number of holes 44 in a plate fixed in relation to the said overhanging bracket. Means are provided for sprinkling flour into the mould during the molding operation and in the preferred form a cup-shaped member 45 is fixed in relation to the roller so that an annular pocket or container for flour is provided. A number of holes 46 are formed in the bottom of this cup-shaped member so that flour or the like drops therethrough down the outside of the roller between the pastry to be molded and the roller. A stationary scraper or brush 47 projects into the cup 45 so that it scrapes against the flour and directs small quantities to drop through the said holes. This scraper and molding roller 29 are conveniently mounted on a spindle 48 which is detachably fixed, such as by means of a screwed stem 49, to the axially movable rod 36, whereby the molding tool and sprinkler form a self-contained unit, consequently facilitating interchangeability. The roller 29 aforementioned may be conical, cylindrical, or any other shape, and is mounted on the rod 48 through the medium of ball bearings.

An adjustable stop is also provided for limiting the movement of the mold towards the axis of the roller, thereby controlling the thickness of the wall of the pie casing. This stop conveniently comprises a rotatable member 50 in which are fitted a number of radially directed screwed pins 51. These pins are adjusted into predetermined positions so that any one pin can be brought into position for acting as a stop against which a projection 52 on the side abuts to limit the movement of the slide. The member 50 is locked in any desired position by means of the spring pressed pin 53.

In some cases it may be necessary to provide for the removal of surplus material which is raised above the top of the mold. For this purpose a trimming knife 54 is carried by a sleeve 55 slidably mounted on a rod 56. This rod 56 is adjustably carried by an arm 57 mounted on the rod 36. The rod 56 engages the screwed pin 58 mounted in the arm 57 so that by rotating this screw the cutter is adjusted towards or from the roller. The pin 56 is locked in the adjusted position by means of the lock nut 59. The sleeve 55 is allowed a limited sliding movement on the pin 56 by means of the pin 60 carried by the sleeve 55 engaging in the slot 63 in the pin 56. When the molding roller is lowered into the mold the cutter 54 will be lowered until it rests on the edge of the mold and any further movement of the molding roller downwards will be provided for by the movement of the pin 56 down the sleeve 55.

The operation of the machine is as follows:—

The dough is first placed in the mould and the foot lever 39 is depressed which brings the molding roller 29 centrally down into the mould which expends the dough outwardly. The lever 9 on the spindle 4 controlling the movement of the slide is pulled forward which causes the wall 12 of the mould to approach the molding roller. The mould is spinning which causes the dough to be rolled out against the wall of the mould to be a predetermined thickness. The roller itself also freely revolves and consequently has a rolling action itself on the pastry or dough. As the roller is mounted on ball bearings it does not rub on the dough but rolls thereon. After the finish of the molding operation the movement of the slide back to the central position automatically cuts off the drive to the molding table which is therefore stationary, and the foot lever is released which allows the molding roller to automatically rise away from the mould. The wall of the mould is then released from the table carrying with it the moulded pie casing. To facilitate removal of the pie casing from the mould, a release device is rotatably mounted on the wall of the mould, and this device conveniently comprises a ring 12, mounted on the top of the mould and having a knife 12b depending therefrom to scrape over the inside face of the mould. When this ring is rotated therefore the pie casing falls away from the mould which is then replaced on the table and a fresh piece of dough or pastry inserted therein. If desired the knife 12b may be omitted.

The machine is particularly applicable for molding pork pie casings which have a larger diameter at the bottom than at the top. Any shaped casing may however be obtained as the molding roller can be moved with the slide to be free to escape through the mouth of the pie casing.

The molding tool is also readily interchangeable whilst the top of the rotatable table may also be interchangeably fitted for receiving any suitable mould.

By the use of the worm and worm drive for driving the rotatable table, such table when stationary is sufficiently rigidly held to permit of the removal and replacement of the mold.

Claims.

1. A machine for molding pie casings comprising a rotary mounted table carrying the mould, means for rotating the table, a molding roller mounted on ball or roller bearings to freely rotate about its own axis, and having a roughened exterior surface to prevent the roller pulling the dough or pastry away from the wall of the mould, means for imparting a relative movement between the table and the roller so that the roller will enter the mould and means for imparting a relative lateral movement of the mould and the roller.

2. A machine for molding pie casings comprising a rotary mounted table carrying the mould, means for rotating the table, a molding roller freely mounted to rotate about its own axis, means for moving the roller into the mould, and means for moving the table laterally in relation to the molding roller.

3. A machine for molding pie casings comprising a rotary mounted table carrying the mould, a movable member carrying the table, means for rotating the table mounted on the movable member, and a molding roller freely mounted to rotate about its own axis and verticaly movable into the mould.

4. A machine for molding pie casings comprising a rotary mounted table carrying the mould, a movable member carrying the table, means for rotating the table mounted on the movable member, a molding roller freely mounted to rotate about its own axis and vertically movable into the mould, and means controlled by the movable member so that the stopping and starting of the rotation of the table is effected by the movement of the movable member carrying the table.

5. A machine for molding pie casings comprising a table, a mould having a wall which is detachable from the mould bottom which is on the said table, a boss on the mould bottom for projecting up between the wall of the mould, a ring forming part of the wall of the mould which is rotatable to free the pie casing from the wall of the mould after the wall has been removed from the mould bottom, a molding roller freely mounted to rotate about its axis, means for relatively moving the molding roller to or from the wall of the mould and means for imparting a relative movement to the molding roller and mould so that the roller has a relative bodily movement inside the mould to roll the pie casing against the wall of the mould.

6. A pie molding machine, comprising a table, a mold thereon, a molding roller freely mounted on a spindle carried by the machine frame to revolve about its own axis, a flour sprinkling device having a receptacle mounted to revolve with the roller, a scraper for directing the flour from the receptacle around the outside of the roller, means for relatively moving the molding roller to or from the wall of the mold and means for imparting a relative movement to the roller and mold so that the roller has a relative bodily movement inside the mold to roll the pie casing against the wall of the mold.

7. A machine for molding pie casings comprising a rotary mounted table carrying the mold, means for rotating the table, a molding roller freely mounted to rotate about its own axis a vertically adjustable rod for raising and lowering the roller carried by such rod, adjustable means for limiting the lowered position of the roller in the mold and means for imparting a relative lateral movement of the mold and roller.

8. A pie molding machine, comprising a slide, a rotary table carried by the slide, a variable speed friction drive for rotating the table carried by the slide, means for disconnecting the drive by means of a stop against which the control member for the friction drive moves when the slide is in a predetermined position, a mold carried by the table, a molding roller freely mounted to rotate about its own axis, means for imparting a relative movement between the table and the roller so that the roller will enter the mold and hand controlled means for moving the slide to move the mold laterally to or from the roller.

9. A pie molding machine, comprising a slide, a rotary table carried by the slide, a variable speed friction drive, carried by the slide for rotating the table, having two face discs and an intermediate disc pivotally mounted to effect the variation in speed, one face disc of which is moved by a lever movable with the slide coacting with a stop on the stationary machine frame to disconnect the drive at a predetermined position, a mold carried by the table, a molding roller freely mounted to rotate about its own axis, means for imparting a relative movement between the table and the roller so that the roller will enter the mold and hand controlled means for moving the slide to move the mold laterally to or from the roller.

10. A machine for molding pie casings comprising a rotary mounted table carrying the mold, means for rotating the table, a molding roller freely mounted to rotate about its own axis a vertically adjustable rod for raising and lowering the roller carried by such rod, and means for imparting a relative lateral movement of the mold and roller, and a cutter for removing surplus material from the edge of the mold which moves vertically with the molding roller and which automatically adjusts itself to rest on the top of the mold.

In witness whereof I have signed this specification.

EJNAR CHRISTIANSEN.